United States Patent [19]
Goddard

[11] Patent Number: 6,029,380
[45] Date of Patent: Feb. 29, 2000

[54] SHOPPING LIST HOLDER FOR SHOPPING CARTS

[76] Inventor: Donald Harry Goddard, 1124 Grand Boulevard, Oakville, Canada, L6H 2V1

[21] Appl. No.: 09/146,351

[22] Filed: Sep. 3, 1998

[51] Int. Cl.[7] .................................................. G09F 3/00
[52] U.S. Cl. ............................................. 40/308; 224/926
[58] Field of Search .......................... 40/308, 312, 658; 211/71.01, 45; 224/926; 248/451, 452, 465.1, 441.1, 447.2, 311.2, 312, 314, 231.21, 231.85

[56] References Cited

U.S. PATENT DOCUMENTS

| | | | |
|---|---|---|---|
| 2,296,028 | 10/1942 | Gribble | 211/74 |
| 3,163,287 | 12/1964 | Barnett | 224/926 X |
| 4,156,318 | 5/1979 | Economy | 40/308 |
| 4,619,386 | 10/1986 | Richardson | 224/926 X |
| 4,685,701 | 8/1987 | Amunson et al. | 248/441.1 |
| 4,743,050 | 5/1988 | Small | 224/926 X |
| 5,004,252 | 4/1991 | Kraper | 40/308 X |
| 5,086,960 | 2/1992 | Schweitzer | 40/308 X |
| 5,487,519 | 1/1996 | Grabowski | 224/926 X |

*Primary Examiner*—Brian K. Green
*Assistant Examiner*—James M Hewitt
*Attorney, Agent, or Firm*—Barrigar & Moss; Robert E. Vernon

[57] ABSTRACT

A list holder is provided for a shopping cart of the type of which has a transverse handle at the rear of the cart, a rear wall which pivots upwardly in order to facilitate nesting of shopping carts, and which has a rear mini-basket formed with the rear wall, a supplemental rear wall which is pivotable about a bottom portion of the rear wall, and a pivotable seat between the rear wall and the supplemental rear wall. The list holder has a tray with a device for temporarily holding a shopping list, e.g. a clip. The tray is secured to a side wall of the shopping cart so that the tray is above the mini-basket and adjacent to the side wall. The list holder also has an arcuate rod for guiding a rearward path of movement of a top portion of the supplemental rear wall when the wall pivots upwardly.

10 Claims, 3 Drawing Sheets

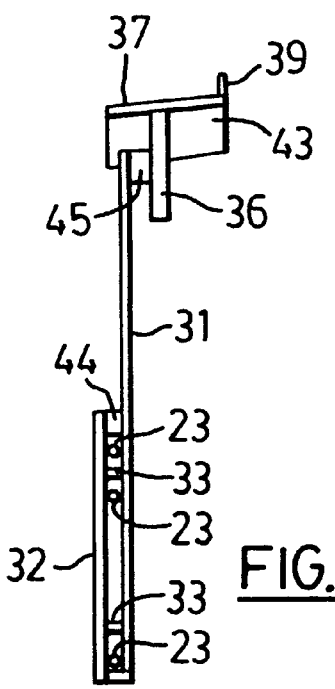
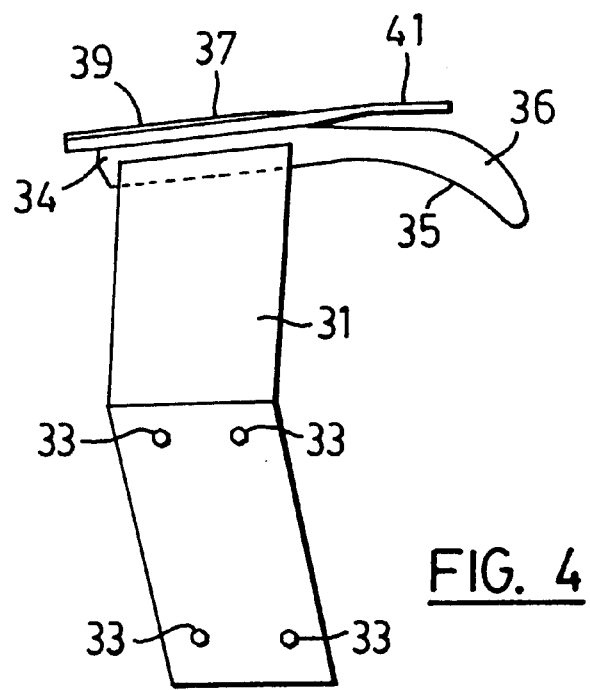
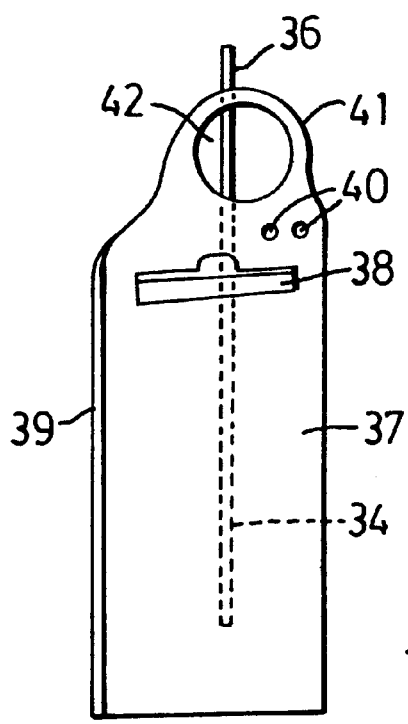

SHOPPING LIST HOLDER FOR SHOPPING CARTS

FIELD OF THE INVENTION

The present invention relates to a list holder for shopping carts, especially one that is fixed to carts of the type which has a pivotable rear wall.

BACKGROUND OF THE INVENTION

It has been noticed that shoppers in retail, food and merchandise outlets either do not use a shopping list or do not have a well-organized way of using the list when shopping. Shopping list holders on shopping carts are known. For example, F. P. Sawyer in U.S. Pat. No. 4,274,567, which issued Jun. 23, 1991 discloses an attachment for a shopping cart. The attachment includes a flat desk panel provided with a clip on the outer surface for securing a note pad. The desk panel is supported on the transverse shopping cart handle. M. Hicks in U.S. Pat. No. 3,881,267 which issued May 6, 1975 also discloses a holder for detachable mounting on the handle of a shopping cart. A. D. Krebs in U.S. Pat. No. 4,858,353, which issued Aug. 22, 1989 discloses a removable grocery shopping organizer. However, such shopping list holders are not secure or tend to rotate about the handle, thus minimizing their value. Heretofore, shopping list holders have had to be mounted on the shopping cart handle or be removable so that the shopping list holder does not interfere with nesting of shopping carts.

The present invention is intended to alleviate the aforementioned difficulties and is applicable to the style of shopping carts in which a rear wall may be swung in order to make the shopping carts nestable.

SUMMARY OF THE INVENTION

The present invention provides a list holder for a shopping cart of the type which has a handle at a rear of the cart, a rear wall pivotable upwardly to facilitate nesting of shopping carts, a rear mini-basket formed with the rear wall, a supplementary rear wall pivotable about a bottom portion of the rear wall, and a pivotable seat between the rear wall and the supplementary rear wall, said list holder comprising:

a tray with means for temporarily holding a shopping list;

means for securing the tray to a side wall of the shopping cart so that the tray is above the mini-basket and adjacent to the side wall; and means for guiding a rearward path of movement of a top portion of the supplementary rear wall when the rear wall pivots upwardly.

In one embodiment, the guiding means has a lower surface which is arcuate for guiding the rearward path of movement of the top portion of the supplementary rear wall.

In another embodiment, the guiding means is an arcuate rod.

In a further embodiment, the means for temporarily holding a shopping list is a clip.

In yet another embodiment, the tray has a cup holder formed in association therewith.

In another embodiment, the cup holder is above the guiding means.

In a further embodiment, the cup holder has an aperture, at least a portion of which is circular.

In yet another embodiment, the aperture in the cup holder has cut-outs for retaining corners of a carton.

BRIEF DESCRIPTION OF THE DRAWINGS

FIG. 3 is a front view of the list holder of FIG. 2.

FIG. 4 is a side view of the list holder.

FIG. 5 is a plan view of the list holder.

DETAILED DESCRIPTION OF THE PREFERRED EMBODIMENTS

Directional indicators such as vertical, horizontal, front, rear, top, bottom, etc., are used for ease of description only and are not to be construed to limit the scope of the invention as herein claimed. These directional indicators refer to the invention when in use mounted to a shopping cart.

Figure 1:
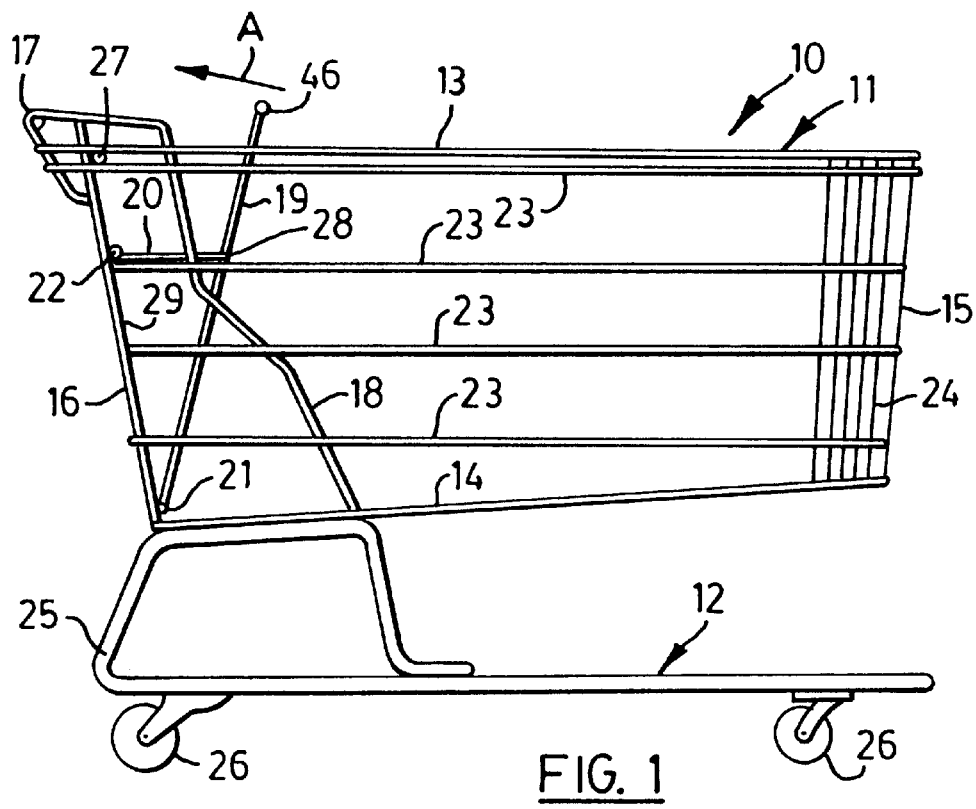
FIG. 1 is a side view of a shopping cart of the type to which a list holder according to the invention is applicable.
Figure 2:
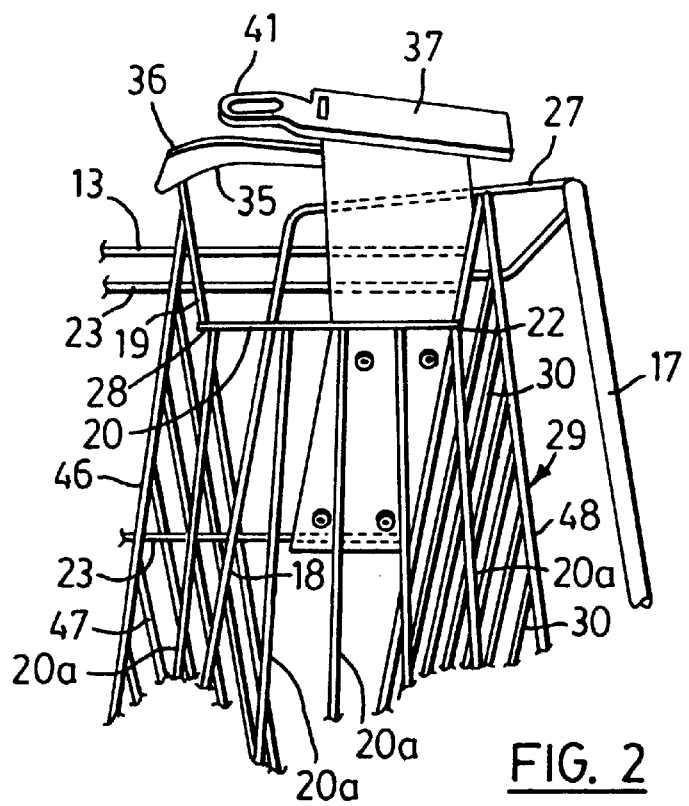
FIG. 2 is a partial perspective view showing a list holder according to a first preferred embodiment of the invention attached to the shopping cart of FIG. 1.

FIG. 1 shows the type of shopping cart 10 to which the present invention applies. Such a shopping cart has a basket designated generally by reference numeral 11 mounted on a trolley indicated generally by numeral 12. The basket 11 has a top rail 13 and a plurality of substantially horizontal rails 23 to which are joined a plurality of substantially vertical wires 24. A front wall 15 of the basket 11 has continuations of horizontal rails 23 and also has a plurality of vertical wires. In FIG. 1, a few vertical wires 24 are shown at the front wall 15 of the shopping cart 10 and the remaining wires on the cart 10 have been omitted for clarity of description. The rear of the cart has a support rail 16 at the termination of each side of shopping cart 10. The bottom 14 of basket 11 is attached to a frame 25 of the trolley 12. The trolley has casters 26 for manoeuvring the shopping cart. The basket 11 has a further support rail 18 which is attached to frame 25 and terminates at handle 17. There is a rear wall designated generally by numeral 29 which is pivotable about pivot 27. FIG. 2 shows a top rail 48 of rear wall 29 and containment wires 30 depending from the top rail 48. The rear wall 29 extends between support rails 16 and is prevented from swinging backwards by a stop (not shown) which is close to pivot 21 (see FIG. 1) for a supplementary wall 19. FIG. 2 shows a top rail 46 of rear supplementary wall 19 and wires 47 depending from the top rail 46. Pivoting on the rear wall 29, at pivot point 22, is a seat 20 comprising wires 20a (see also FIG. 1). Supplementary wall 19 is prevented from pivoting into the main portion of basket 11 by means of a slidable catch 28 which is attached to seat 20.

Referring again to FIG. 1, when a second shopping cart similar to the shopping cart 10 shown in FIG. 1 is to be nested in the shopping cart 10, a front wall of the second shopping cart is pushed against the rear wall 29 of the cart 10 so that the rear wall 29 is pivoted about pivot 27. As the rear wall 29 is moved forwardly, pivoting about pivot 27, the top of supplementary wall 19 moves in the direction of arrow A. As supplementary wall 19 approaches a horizontal position, the seat 20 is caused to pivot about pivot point 22 so that supplementary wall 19 collapses against rear wall 29.

A first preferred embodiment of the shopping list holder of the present invention is shown in FIGS. 2 to 5 and best seen in FIGS. 3 to 5. The shopping list holder has a vertical wall 31 and a clamping plate 32. The upper edge of wall 31 is attached to spacer piece 45 which in turn is attached to tray support 34. Tray 37 is attached to the upper side of tray support 34. The tray support 34 and tray 37 are arranged so that the tray slopes downwardly towards the rear of the shopping cart, for easy reading and writing thereon. The tray 37 is located above the mini-basket formed by the upper portions of rear wall 29 and supplementary wall 19 and by seat 20 (see FIGS. 1 and 2).

With particular reference to FIG. 5, tray 37 has a clip 38 which is suitable for holding papers or a memo pad on the surface of tray 37. One side of tray 37 has a lip guide 39 which is useful for positioning a writing pad. Tray 37 has holes 40 which are intended to receive the ends of a pen or pencil. The embodiment in FIG. 5 also has a cup holder 41 with an aperture 42 which is suitable for receiving a coffee cup. Tray support 34 includes an integrally formed hooked guide post 36 extending forwardly therefrom. The hooked guide post has a curved underside 35. The function of the hooked guide post will be described hereinafter. The diameter of aperture 42 may be sufficient to allow a coffee cup of truncated cone shape to fit snugly therein. If the coffee cup is too small in diameter to snugly fit in aperture 42, then the bottom of the coffee cup may rest on the upper surface of hooked guide post 36.

As will be seen from FIGS. 2 and 3, the shopping list holder is attached to a side wall of the shopping cart, close to the rear of such side wall. Vertical wall 31 of the list holder and clamping plate 32 straddle horizontal rails 23 and vertical wires 24 of the side wall and are secured together by bolts 33 or other suitable fasteners. Spacer 44 is used to rest on one of the rails 23 to locate the vertical wall 31 in a proper location on the side wall of the cart 10. When clamped in the proper position, the tip of hooked guide post 36 is situated just above the top rail 46 of supplementary rear wall 19.

It will be understood that if there is little clearance between the rear wall 29 and the side wall of basket 11 when the rear wall 29 is swung about pivot 27, there may be insufficient room for the clamping plate 32. If this is the case, other means for securing the list holder to the sidewall may be used, e.g. countersunk or recessed bolts in corresponding bolt holes in the basket wall.

When one shopping cart is nested in another, as described above, the front wall 15 of a second cart is pushed against the rear wall 29 of a first cart so that the rear wall 29 is pivoted about pivot 27 and swung into the main portion of basket 11. As a consequence of rear wall 29 being swung into basket 11, supplementary rear wall 19 is lifted. As will be apparent from FIG. 2, top rail 46 of supplementary rear wall 19 will then come into contact with lower surface 35 of hooked guide post 36. The arcuate shape of lower surface 35 guides top rail 46 rearwardly, so that supplementary rear wall 19 is forced to pivot about pivot 21. The movement of supplementary rear wall 19 in this fashion causes slidable latch 28 to rise towards top rail 46, thus pivoting seat 20 about pivot 22. As rear wall 29 is lifted into a substantially horizontal position, supplementary rear wall 19 collapses into contact with rear wall 29. Without the presence of hooked guide post 36, the supplementary rear wall 19 may not start to pivot about pivot 21 sufficiently early, and the top rail 46 may therefore be lifted over or into the front edge of tray 37 or cup holder 41, if present. Without the hooked guide post, therefore, the interference of supplementary rear wall 19 with the list holder may cause jamming of the carts.

It will be understood that the cup holder 41 can be omitted if not required. It will be also understood that pens or pencils may be held by other means, e.g. by a chain or cable, or with a clip, e.g. at the side or rear of tray 37. The tray 37 may have adjustment means for tilting the tray to a suitable slant.

The embodiment shown in the Figures is made of wood, for illustrative purposes. The list holder may be made of any suitable material, e.g. wood, metal, synthetic polymers. Suitable polymers include ABS, high density polyethylene, polypropylene. The list holder may be made using known manufacturing techniques, e.g injection moulding, blow moulding, metal stamping, wire bending.

The list holder may be attached to shopping carts made of wire (as shown in FIGS. 1 and 2), but may also be used on shopping carts made from other materials, e.g. synthetic thermoplastic polymers.

When in use, a shopping list may be held on tray 37 by clip 38. The shopping list may be a single piece of paper brought by the shopper. Alternatively, the shopping list may be in the form of a pad, with tear-off pages. The pad may have a waterproof backing, in case the tray is wet after the cart has been left outside in the rain.

Figure 6:
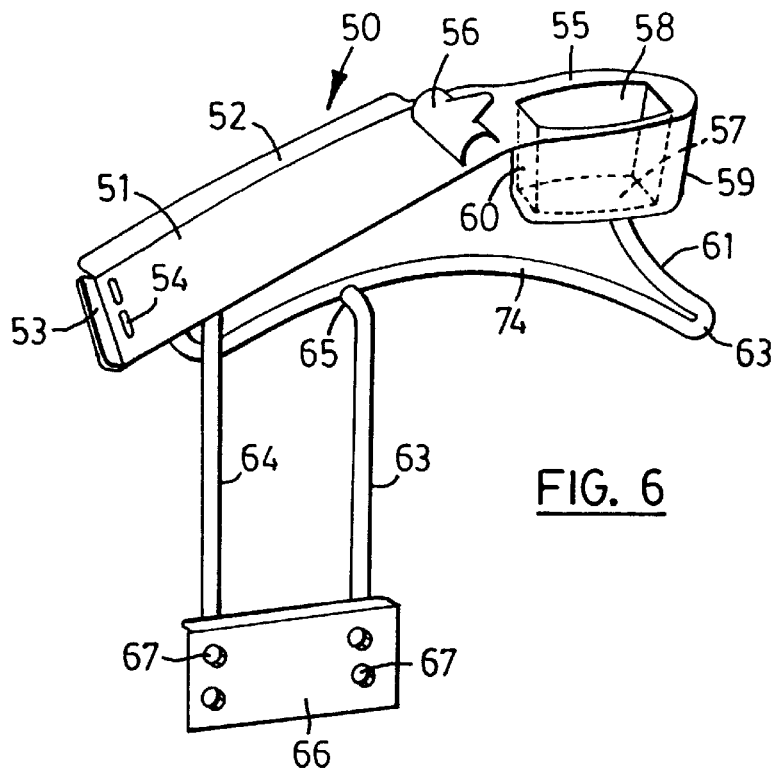
FIG. 6 is a perspective view of a list holder according to a second preferred embodiment of the invention.
Figure 7:
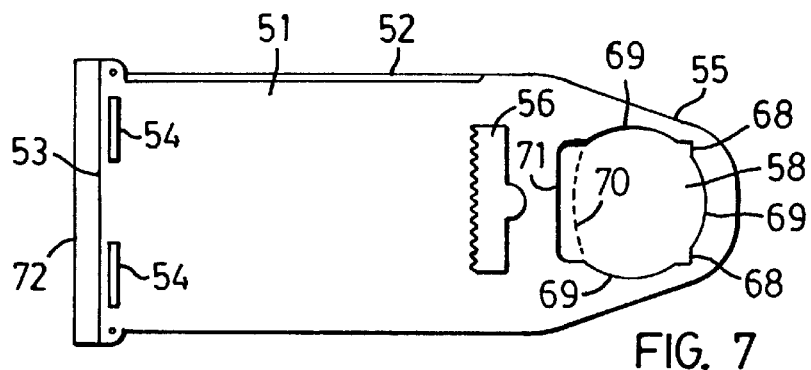
FIG. 7 is a plan view of a tray of the list holder of FIG. 6.
Figure 8:
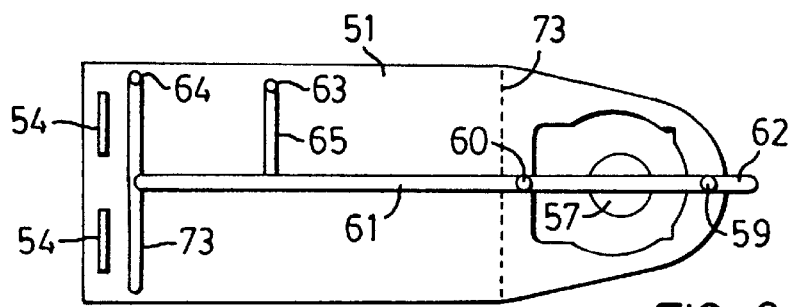
FIG. 8 is a bottom view of the list holder of FIG. 6.

A shopping list holder indicated generally by numeral 50 and according to a second preferred embodiment of the invention is shown in FIGS. 6 to 8. The shopping list holder 50 has two vertical rods 63 and 64 and a clamping plate 66. Clamping plate 66 may be attached to a cart by means of bolts 67. The upper ends of rods 63 and 64 are attached to transverse support rods 65 and 73 respectively, which in turn are attached to tray support rod 61. Tray 51 is welded to the upper surfaces of tray support rod 61 and transverse support rods 65 and 73. The tray support rod 61 and tray 51 are arranged so that the tray slopes downwardly towards the rear of the shopping cart, for easy reading and writing thereon.

Tray 51 has a clip 56 which is suitable for holding papers or a memo pad on the surface of tray 51. One side of tray 51 has a lip guide 52 which is useful for positioning a writing pad. The lower end of tray 51 also has an end lip 53. FIG. 7 shows an extension 72 to lip 53 before the extension has been bent upwardly to form lip 53. Tray 51 has holes 54, adjacent to lip 53, for drainage of water or other liquid which may fall or spill onto the top surface of tray 51. Lip 53 may serve to hold a pencil temporarily. The front portion of tray 51 has a holder 55 with an aperture 58 which is suitable for receiving a coffee cup, juice carton or milk carton (not shown). For convenience, aperture 58 may have circular portions 69 with cut-outs 68 and 71. Cut-outs 68 are intended to allow corners of cartons to fit snugly therein. Cut-out 71 is dimensioned to accomodate a side of a carton. The circular portion 69 are intended to hold a circular cross-section cup or mug. Beneath aperture 58 there is a support platform 57 for supporting the bottom of a carton or cup. Support platform 57 is attached to cup holder 55 by support rods 59 and 60. Support rods 59 and 60 may be joined underneath support platform 57, so that they form a single rod. Tray support 61 has a hooked guide post 61 which has a curved underside 74. Hooked guide post has a forward end 62. Hooked guide post is welded to the underside of support platform 57.

The effective diameter of aperture 58 defined by extending circular portion 69 (see dotted line 70 in FIG. 7), is sufficient to allow a coffee cup of truncated cone shape to fit snugly therein. If the coffee cup is too small in diameter to snugly fit in aperture 58, then the bottom of the coffee cup may rest on the upper surface of support platform 57. Similarly a juice carton of rectangular cross-section would fit with one side in cut-out 71 and opposing corners in cut-outs 68, with the bottom of the juice carton resting on support platform 57.

The embodiment shown in FIG. 6 to 8 is preferably made of metal, stamped, laser cut, bent and welded as appropriate before being coated with a finish suitable for outdoor use.

The foregoing description is by way of example only and is not meant to limit the scope of the invention as hereinafter claimed:

1. A list holder for a shopping cart which has a handle at a rear of the cart, a rear wall pivotable upwardly to facilitate nesting of shopping carts, a rear mini-basket formed with the rear wall, a supplementary rear wall pivotable about a bottom portion of the rear wall, and a pivotable seat between the rear wall and the supplementary rear wall, said list holder comprising:

a tray with means for temporarily holding a shopping list;

means for securing the tray to a side wall of the shopping cart so that the tray is above the mini-basket and adjacent to the side wall; and means for guiding a rearward path of movement of a top portion of the supplementary rear wall when the rear wall pivots upwardly, said guiding means having a lower surface which is arcuate.

2. A list holder according to claim 1 wherein the guiding means is a rod.

3. A list holder according to claim 1 wherein the means for temporarily holding a shopping list is a clip.

4. A list holder according to claim 1 wherein the tray has a cup holder formed in association therewith.

5. A list holder according to claim 4 wherein the cup holder is above the guiding means.

6. A list holder according to claim 2 wherein the lower arcuate surface of the rod defines an arc of a circle with a center about at a pivot point for the supplementary rear wall.

7. A list holder according to claim 4 wherein the cup holder has an aperture of which a portion is circular.

8. A list holder according to claim 7 wherein the aperture has cut-outs for retaining corners of a carton.

9. A list holder for a shopping cart which has a handle at a rear of the cart, a rear wall pivotable upwardly to facilitate nesting of shopping carts, a rear mini-basket formed with the rear wall, a supplementary rear wall pivotable about a bottom portion of the rear wall, and a pivotable seat between the rear wall and the supplementary rear wall, said list holder comprising:

a tray with means for temporarily holding a shopping list;

means for securing the tray to a side wall of the shopping cart so that the tray is above the mini-basket and adjacent to the side wall; and means for guiding a rearward path of movement of a top portion of the supplementary rear wall when the rear wall pivots upwardly;

wherein said guiding means is a rod having a lower surface which is arcuate and said list holder further includes a cup holder formed in association with said tray.

10. A list holder according to claim 9 wherein the lower arcuate surface of the rod defines an arc of a circle with a center about at a pivot point for the supplementary rear wall.

* * * * *